United States Patent Office 2,939,816
Patented June 7, 1960

2,939,816

INSECT DETERRENTS CONTAINING STAPHISAGRIA

Harold L. Trexler, 221 N. 6th St., Reading, Pa.

No Drawing. Filed Mar. 19, 1956, Ser. No. 572,212

3 Claims. (Cl. 167—55)

This invention relates to insect deterrents, and more particularly it relates to a product which when taken internally, or applied externally, will act to deter insects, and particularly mosquitoes and certain flies, from biting humans and other animals.

Reference herein to "bites" of insects should be taken to include those which sting or suck by means of suitable portions of their anatomy provided by nature for that purpose.

The principal object of the present invention is to provide a product which may be administered internally, or applied externally, for the purpose of deterring insects, and particularly mosquitoes and certain flies, from biting persons and animals to which the product is administered.

A further object of the present invention is to provide a product of the character aforesaid which will not in itself be toxic, in the quantities employed, or have any other deleterious effect upon the persons using the same.

A further object of the present invention is to provide a product of the character aforesaid which may be administered in various ways to accomplish the intended purpose.

It has been discovered that when a small quantity of the product made of triturated portions of the staphisagria plant, and particularly the seeds thereof, is administered either in the form of the triturate, or in tablets, or in a suitable liquid vehicle, or in any other preferred manner, the person taking or applying the same will be rendered immune to the bites of various insects, and particularly mosquitoes. Such immunity is established about two hours after taking same, and ordinarily such immunity will last for several days, although the period of immunity varies in different persons.

The preferred manner of administering the product is to form the same into granules of a size of about one grain, each containing .00004 part by weight of the powder of the seeds of staphisagria, in a carrier of one part by weight of lactose.

The ordinary dosage for an adult person is from two to three granules of such composition taken every four hours the day before exposure, and continuing thereafter twice daily during the period of exposure.

It has been noted through various experiments on several hundred people that the product is apparently absorbed on the tongue and mucous membrane of the mouth and alimentary canal, and therefore it has also been found that the active principle of the product may be administered through the mouth piece of a cigarette, which, when smoked, will act in a manner similar to that of granules or tablets taken internally.

In any event, and however the product is administered in any of the ways as above set forth, it will have a peculiar action on the skin or through the skin, so that even though mosquitoes or certain other insects may alight on the body, such insects will be deterred from biting in the ordinary and customary manner.

It has also been noted, in the experimentation that was carried on, that various strong drugs, such as sedatives, anti-spasmotics, anti-allergics, or coal tar analgesics, may retard or nullify the action of the product, particularly if taken habitually. It is therefore better to administer the product of the present invention for its intended purpose a considerable period before or after any such medication.

It has also been found that the product may be used by external application in the form of an ointment, jell, or semi-solid stick, in which the product is incorporated.

This application is a continuation-in-part of my pending application, Serial No. 309,380, filed September 12, 1952, and now abandoned.

Having thus described my invention, I claim:

1. The process of internally administering powdered seeds of the staphisagria plant to living subjects including human beings and animals for the purpose of deterring insects from biting said subjects, comprising the step of administering said powdered seeds in limited dosages internally to said subjects each dosage comprising about .00004 grain of staphisagria, at least two hours prior to the anticipated exposure of said subjects to said insects.

2. The process of administering internally the seeds of the staphisagria plant to living subjects including human beings and animals for the purpose of deterring insects from biting said subjects, comprising the step of administering a tablet containing about .00004 part by weight of powdered staphisagria seeds, the remainder of said tablet consisting essentially of lactose, internally to said subjects at least about two hours prior to anticipated exposure of said subjects to said insects, and at a frequency of about two to three of said tablets per four hour period.

3. The process of internally administering the triturated seeds of the staphisagria plant to living subjects including human beings and animals for the purpose of deterring insects from biting said subjects comprising the administration of a dosage consisting essentially of about .00004 triturated portions by weight of the seeds of the staphisagria plant in one part by weight of an alcoholic vehicle and administering such dosage internally to said subjects at least two hours prior to the anticipated exposure of said subjects to said insects and at a frequency of two to three of said dosages per four hour period.

References Cited in the file of this patent

The Homeopathic Pharmacopoeia of the U.S., 1941, pp. 46, 47, 534, 535.

King: Am. Disp. (1870), pp. 327–329.

Extra Pharmacopoeia, vol. 1, 22nd ed. (1941), p. 868.